US008918469B2

(12) United States Patent
Sprague et al.

(10) Patent No.: US 8,918,469 B2
(45) Date of Patent: Dec. 23, 2014

(54) METHODS, SYSTEMS, AND COMPUTER READABLE MEDIA FOR SHARING DIAMETER BINDING DATA

(75) Inventors: David M. Sprague, Raleigh, NC (US); Mark E. Kanode, Apex, NC (US); Thomas M. McCann, Raleigh, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 0 days.

(21) Appl. No.: 13/409,893

(22) Filed: Mar. 1, 2012

(65) Prior Publication Data

US 2012/0226758 A1 Sep. 6, 2012

Related U.S. Application Data

(60) Provisional application No. 61/448,041, filed on Mar. 1, 2011.

(51) Int. Cl.
*G06F 15/16* (2006.01)
*H04L 12/14* (2006.01)

(52) U.S. Cl.
CPC .................................... *H04L 12/14* (2013.01)
USPC ........... 709/206; 709/241; 370/328; 370/235; 370/392; 455/515; 455/406

(58) Field of Classification Search
USPC .................. 709/206, 241; 370/328, 235, 392; 455/515, 406
See application file for complete search history.

(56) References Cited

U.S. PATENT DOCUMENTS

| | | | |
|---|---|---|---|
| 1,872,857 | A | 4/1931 | Wesson et al. |
| 6,298,383 | B1 | 10/2001 | Gutman et al. |
| 7,292,592 | B2 | 11/2007 | Rune |
| 7,551,926 | B2 | 6/2009 | Rune |
| 8,015,293 | B2 | 9/2011 | Schaedler et al. |

(Continued)

FOREIGN PATENT DOCUMENTS

| | | | |
|---|---|---|---|
| EP | 1 357 720 | A1 | 10/2003 |
| EP | 2 242 205 | A1 | 10/2010 |

(Continued)

OTHER PUBLICATIONS

Notification of Transmital of the International Search Report and the Written Opinion of the International Searching Authority, or the Declaration for International Patent Application No. PCT/US2012/027281 (Jun. 15, 2012).

(Continued)

*Primary Examiner* — Thuong Nguyen
(74) *Attorney, Agent, or Firm* — Jenkins, Wilson, Taylor & Hunt, P.A.

(57) ABSTRACT

According to one aspect, the subject matter described herein includes a method for sharing Diameter binding data. The method includes receiving, by a first Diameter signaling router (DSR), a first Diameter message requiring processing. The method also includes selecting, by the first DSR, a processing element to perform the required processing from a plurality of processing elements. The method further includes routing, by the first DSR, the received first Diameter message to the selected processing element. The method further includes creating, by the first DSR, a binding record associating the selected processing element with information associated with the received first Diameter message. The method further includes communicating, by the first DSR, the binding record to a second DSR.

33 Claims, 7 Drawing Sheets

(56) References Cited

U.S. PATENT DOCUMENTS

| | | | | |
|---|---|---|---|---|
| 8,547,908 | B2 | 10/2013 | Marsico | |
| 8,615,237 | B2 | 12/2013 | Baniel et al. | |
| 8,737,304 | B2 | 5/2014 | Karuturi et al. | |
| 8,825,060 | B2 | 9/2014 | McCann et al. | |
| 2002/0147845 | A1 | 10/2002 | Sanchez-Herrero | |
| 2002/0194378 | A1 | 12/2002 | Foti | |
| 2002/0196775 | A1 | 12/2002 | Tuohino et al. | |
| 2003/0040280 | A1 | 2/2003 | Koskelainen | |
| 2003/0131151 | A1 | 7/2003 | Roach et al. | |
| 2004/0103157 | A1 | 5/2004 | Requena et al. | |
| 2004/0152469 | A1 | 8/2004 | Yla-Outinen et al. | |
| 2004/0205212 | A1 | 10/2004 | Huotari et al. | |
| 2004/0223489 | A1 | 11/2004 | Rotsten et al. | |
| 2004/0225878 | A1 | 11/2004 | Costa-Requena et al. | |
| 2004/0242227 | A1 | 12/2004 | Huotari et al. | |
| 2004/0246965 | A1 | 12/2004 | Westman et al. | |
| 2005/0007984 | A1 | 1/2005 | Shaheen et al. | |
| 2005/0009520 | A1 | 1/2005 | Herrero et al. | |
| 2005/0058125 | A1 | 3/2005 | Mutikainen et al. | |
| 2005/0078642 | A1 | 4/2005 | Mayer et al. | |
| 2005/0094594 | A1 | 5/2005 | Roh | |
| 2005/0120198 | A1 | 6/2005 | Bajko et al. | |
| 2005/0124341 | A1 | 6/2005 | Myllymaki et al. | |
| 2005/0136926 | A1 | 6/2005 | Tammi et al. | |
| 2005/0155036 | A1 | 7/2005 | Tiainen et al. | |
| 2005/0159156 | A1 | 7/2005 | Bajko et al. | |
| 2005/0235000 | A1 | 10/2005 | Keil | |
| 2006/0030320 | A1 | 2/2006 | Tammi et al. | |
| 2006/0045249 | A1 | 3/2006 | Li et al. | |
| 2006/0068816 | A1 | 3/2006 | Pelaez et al. | |
| 2006/0077926 | A1 | 4/2006 | Rune | |
| 2006/0078119 | A1 | 4/2006 | Jee et al. | |
| 2006/0136557 | A1 | 6/2006 | Schaedler et al. | |
| 2006/0161512 | A1 | 7/2006 | Schaedler et al. | |
| 2006/0172730 | A1 | 8/2006 | Matsuda | |
| 2006/0221972 | A1 | 10/2006 | Bhargava et al. | |
| 2006/0259759 | A1 | 11/2006 | Maino et al. | |
| 2006/0274744 | A1 | 12/2006 | Nagai et al. | |
| 2007/0121596 | A1 | 5/2007 | Kurapati et al. | |
| 2007/0242637 | A1 | 10/2007 | Dynarski et al. | |
| 2007/0297419 | A1 | 12/2007 | Asherup et al. | |
| 2008/0039104 | A1 | 2/2008 | Gu et al. | |
| 2009/0080440 | A1 | 3/2009 | Balyan et al. | |
| 2009/0129271 | A1 | 5/2009 | Ramankutty et al. | |
| 2009/0196231 | A1 * | 8/2009 | Giaretta et al. | 370/328 |
| 2009/0196290 | A1 | 8/2009 | Zhao et al. | |
| 2009/0221310 | A1 | 9/2009 | Chen et al. | |
| 2009/0232011 | A1 | 9/2009 | Li et al. | |
| 2009/0264097 | A1 * | 10/2009 | Cai et al. | 455/406 |
| 2009/0265467 | A1 | 10/2009 | Peles | |
| 2009/0305684 | A1 | 12/2009 | Jones et al. | |
| 2009/0313379 | A1 | 12/2009 | Rydnell et al. | |
| 2010/0290392 | A1 | 11/2010 | Rasanen et al. | |
| 2010/0291923 | A1 | 11/2010 | Zhou et al. | |
| 2010/0299451 | A1 * | 11/2010 | Yigang et al. | 709/241 |
| 2010/0311392 | A1 | 12/2010 | Stenfelt et al. | |
| 2010/0331023 | A1 | 12/2010 | Cai et al. | |
| 2011/0116378 | A1 | 5/2011 | Ramankutty et al. | |
| 2011/0116382 | A1 | 5/2011 | McCann et al. | |
| 2011/0165901 | A1 | 7/2011 | Baniel et al. | |
| 2011/0199906 | A1 * | 8/2011 | Kanode et al. | 370/235 |
| 2011/0200053 | A1 | 8/2011 | Kanode et al. | |
| 2011/0202612 | A1 | 8/2011 | Craig et al. | |
| 2011/0202614 | A1 * | 8/2011 | Graig et al. | 709/206 |
| 2011/0202676 | A1 | 8/2011 | Craig et al. | |
| 2011/0225113 | A1 * | 9/2011 | Mann | 706/47 |
| 2011/0225280 | A1 | 9/2011 | Delsesto et al. | |
| 2011/0225306 | A1 | 9/2011 | Delsesto et al. | |
| 2011/0282904 | A1 | 11/2011 | Schaedler et al. | |
| 2011/0302244 | A1 | 12/2011 | McCann et al. | |
| 2011/0314178 | A1 | 12/2011 | Kanode et al. | |
| 2012/0096177 | A1 * | 4/2012 | Rasanen | 709/228 |
| 2012/0124220 | A1 * | 5/2012 | Zhou et al. | 709/227 |
| 2012/0155389 | A1 | 6/2012 | McNamee et al. | |
| 2012/0155470 | A1 * | 6/2012 | McNamee et al. | 370/392 |
| 2012/0202550 | A1 * | 8/2012 | Marsico | 455/515 |
| 2012/0224524 | A1 | 9/2012 | Marsico | |
| 2012/0224531 | A1 | 9/2012 | Karuturi et al. | |
| 2012/0225679 | A1 | 9/2012 | McCann et al. | |
| 2012/0226814 | A1 | 9/2012 | Stucker | |
| 2012/0239771 | A1 * | 9/2012 | Rasanen | 709/206 |
| 2012/0311064 | A1 | 12/2012 | Deo | |
| 2014/0258423 | A1 | 9/2014 | Schaedler et al. | |

FOREIGN PATENT DOCUMENTS

| | | | |
|---|---|---|---|
| EP | 2 220 841 | B1 | 9/2011 |
| EP | 1 846 832 | B1 | 4/2012 |
| WO | WO 2006/066149 | A2 | 6/2006 |
| WO | WO 2010/139360 | A1 | 12/2010 |
| WO | WO 2011/082090 | A2 | 7/2011 |
| WO | WO 2011/156274 | A2 | 12/2011 |
| WO | WO 2012/106710 | A1 | 8/2012 |
| WO | WO 2012/118963 | A1 | 9/2012 |
| WO | WO 2012/118967 | A1 | 9/2012 |
| WO | WO 2012/119147 | A1 | 9/2012 |
| WO | WO 2012/154674 | A2 | 11/2012 |

OTHER PUBLICATIONS

Notification of Transmittal of the International Search Report and the Written Opinion of the International Searching Authority, or the Declaration for International Application No. PCT/US2012/027263 (Jun. 14, 2012).

Notification of Transmittal of the International Search Report and the Written Opinion of the International Searching Authority, or the Declaration for International Patent Application No. PCT/US2012/027736 (Jun. 12, 2012).

Notification of Transmittal of the International Search Report and the Written Opinion of the International Searching Authority, or the Declaration for International Patent Application No. PCT/US2012/023971 (Jun. 11, 2012).

Notification of Transmittal of the International Search Report and the Written Opinion of the International Searching Authority, or the Declaration for International Patent Application No. PCT/US2012/027269 (Jun. 11, 2012).

Commonly-assigned, co-pending International Application No. PCT/US12/27736 for "Methods, Systems, and Computer Readable Media for Enriching a Diameter Signaling Message," (Unpublished, filed Mar. 5, 2012).

Commonly-assigned, co-pending U.S. Appl. No. 13/412,352 titled "Methods, Systems, and Computer Readable Media for Enriching a Diameter Signaling Message," (Unpublished, filed Mar. 5, 2012).

Commonly-assigned, co-pending International Application No. PCT/US12/27281 for "Methods, Systems, and Computer Readable Media for Hybrid Session Based Diameter Routing," (Unpublished, filed Mar. 1, 2012).

Commonly-assigned, co-pending U.S. Appl. No. 13/409,949 titled "Methods, Systems, and Computer Readable Media for Hybrid Session Based Diameter Routing," (Unpublished, filed Mar. 1, 2012).

Commonly-assigned, co-pending International Application No. PCT/US12/27269 for "Methods, Systems, and Computer Readable Media for Dynamically Learning Diameter Binding Information," (Unpublished, filed Mar. 1, 2012).

Commonly-assigned, co-pending U.S. Appl. No. 13/409,914 titled "Methods, Systems, and Computer Readable Media for Dynamically Learning Diameter Binding Information," (Unpublished, filed Mar. 1, 2012).

Notification of Transmittal of the International Search Report and the Written Opinion of the International Searching Authority, or the Declaration for International Application No. PCT/US2011/039285 (Feb. 9, 2012).

Commonly-assigned, co-pending International Application No. PCT/US12/23971 for "Methods, Systems, and Computer Readable Media for Provisioning a Diameter Binding Repository," (Unpublished, filed Feb. 6, 2012).

Commonly-assigned, co-pending U.S. Appl. No. 13/366,928 titled "Methods, Systems, and Computer Readable Media for Provisioning a Diameter Binding Repository," (Unpublished, filed Feb. 6, 2012).

(56) References Cited

OTHER PUBLICATIONS

Notification of the Transmittal of the International Search Report and the Written Opinion of the International Searching Authority, or the Declaration for International Application No. PCT/US2010/061934 (Oct. 25, 2011).
"3rd Generational Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).
3GPP, "3rd Generation Partnership Project; Technical Specification Group Services and System Aspects; Policy and Charging Control Architecture (Release 11)," 3GPP TS 23.203 V11.0.1, pp. 1-137 (Jan. 2011).
"Digital cellular telecommunications system (Phase 2+); Universal Mobile Telecommunications System (UMTS); LTE; IP Multimedia Subsystem (IMS); Stage 2 (3GPP TS 23.228 version 9.4.0 Release 9)," ETSI TS 123 228, V9.4.0 (Oct. 2010).
"Digital cellular telecommunications system (Phase 2+); Universal Mobile Telecommunications System (UMTS); LTE; End-to-end Quality of Service (QoS) concept and architecture (3GPP TS 23.207 version 9.0.0 Release 9)," ETSI TS 123 207, V9.0.0 (Oct. 2010).
"3rd Generation Partnership Project; Technical Specification Group Services and System Aspects; Telecommunication management; Charging management; Packet Switched (PS) domain charging (Release 9)," 3GPP TS 32.251, V9.4.0 (Oct. 2010).
"3rd Generation Partnership Project; Technical Specification Group Services and System Aspects; Telecommunication management; Charging management; Diameter charging applications (Release 9)," 3GPP TS 32.299, V9.4.0 (Jun. 2010).
"3rd Generation Partnership Project; Technical Specification Group Services and System Aspects; Telecommunication management; Charging management; Charging architecture adn principles (Release 9)," 3GPP TS 32.240, V9.1.0 (Jun. 2010).
Znaty, "Diameter, GPRS, (LTE+ePC=EPS), IMS, PCC, and SDM," EFORT, pp. 1-229 (Part 1 of 3) (May 2010).
Znaty, "Diameter, GPRS, (LTE+ePC=EPS), IMS, PCC and SDM," EFORT pp. 230-461 (Part 2 of 2) (May 2010).
3GPP, "3rd Generation Partnership Project; Technical Specification Group Core Network and Terminals; Policy and Charging Control signaling flows and Quality of Service (QoS) parameter mapping (Release 9)," 3rd Generation Partnership Project, TS 29.213 V9.2.0, pp. 1-129 (Mar. 2010).
"3rd Generation Partnership Project; Technical Specification Group Core Network and Terminals; Policy and Charging Control over Gx reference point (Release 9)," 3GPP TS 29.212 V9.2.0 (Mar. 2010).
Hakala et al., "Diameter Credit-Control Application," RFC 4006, pp. 1-114 (Aug. 2005).
Calhoun et al., "Diameter Network Access Server Application," RFC 4005, pp. 1-85 (Aug. 2005).
Calhoun et al., "Diameter Mobile IPv4 Application," RFC 4004, pp. 1-53 (Aug. 2005).
"IMS Security Framework," 3GPP2 S.R0086-0, Version 1.0, pp. 1-39 (Dec. 11, 2003).
"IP Multimedia Subsystem—Accounting Information Flows and Protocol," 3GPP2 X.S0013-008-0, Version 1.0, pp. 1-42 (Dec. 2003).
"IP Multimedia Subsystem—Charging Architecture," 3GPP2 X.S0013-007-0, Version 1.0, pp. 1-16 (Dec. 2003).
Calhoun et al., "Diameter Base Protocol," RFC 3588, pp. 1-147 (Sep. 2003).
Olson et al., "Support for IPv6 in Session Description Protocol (SDP)," RFC 3266, pp. 1-5 (Jun. 2002).
Non-Final Office Action for U.S. Appl. No. 13/154,119 (May 2, 2013).
Non-Final Office Action for U.S. Appl. No. 13/366,928 (Mar. 26, 2013).
Communication of European publication number and information on the application of Article 67(3) EPC for European Patent Application No. 11792956.2 (Mar. 13, 2013).
Non-Final Office Action for U.S. Appl. No. 13/409,949 (Feb. 15, 2013).
Notice of Allowance and Fee(s) Due for U.S. Appl. No. 13/366,928 (Jan. 7, 2013).
Non-Final Office Action for U.S. Appl. No. 13/192,410 (Dec. 20, 2012).
Commonly-assigned, co-pending U.S. Appl. No. 13/712,481 for "Methods, Systems, and Computer Readable Media for Encrypting Diameter Identification Information in a Communication Network," (Unpublished, filed Dec. 12, 2012).
Non-Final Official Action for U.S. Appl. No. 12/409,914 (Nov. 6, 2012).
Notification of Transmittal of the International Search Report and the Written Opinion of the International Searching Authority, or the Declaration for International Patent Application No. PCT/US2012/036784 (Nov. 1, 2012).
Non-Final Official Action for U.S. Appl. No. 13/412,352 (Oct. 26, 2012).
Communication of European publication number and information on the application of Article 67(3) EPC for European Patent Application No. 10841605.8 (Oct. 17, 2012).
Decision to grant a European patent pursuant to Article 97(1) EPC for European Application No. 05854512.0 (Mar. 15, 2012).
Communication under Rule 71(3) EPC for European application No. 05854512.0 (Nov. 11, 2011).
Notice of Allowance and Fee(s) Due for U.S. Appl. No. 11/303,757 (May 11, 2011).
Official Action for U.S. Appl. No. 11/303,757 (Dec. 22, 2010).
3GPP, "3rd Generation Partnership Project; Technical Specification Group Core Network and Terminals; Sh Interface based on the Diameter protocol; Protocol details (Release 8)," 3GPP TS 29.329, V8.8.0. (Dec. 2010).
Communication pursuant to Article 94(3) EPC for European Application No. 05 854 512.0 (Oct. 12, 2010).
Communication pursuant to Article 94(3) EPC for European Application No. 05854512.0 (Feb. 8, 2010).
Final Official Action for U.S. Appl. No. 11/303,757 (Dec. 9, 2009).
Supplementary European Search Report for European Application No. 05854512.0 (Nov. 17, 2009).
Official Action for U.S. Appl. No. 11/303,757 (May 28, 2009).
Final Official Action for U.S. Appl. No. 11/303,757 (Oct. 6, 2008).
Official Action for U.S. Appl. No. 11/303,757 (May 7, 2008).
Notification of Transmittal of the International Search Report and the Written Opinion corresponding to International Application No. PCT/US05/45813 (Mar. 24, 2008).
Official Action for U.S. Appl. No. 11/303,757 (Feb. 21, 2008).
Restriction Requirment for U.S. Appl. No. 11/303,757 (Oct. 4, 2007).
"Tekelec Announces TekCore IMS Core Platform," (Jun. 5, 2006).
"Operator Guidebook to IMS and New Generation Networks and Services," www.morianagroup.com, Second Edition (Feb. 2006).
Rouse, "Platform," http://searchservervirtualization.techtarget.com/definition/platform, pp. 1-2 (2006-2009).
"Operator Guidebook to IMS and New Generation Networks and Services," www.morianagroup.com, First Edition, pp. 1-450 (Aug. 2005) (Part 1 of 2).
"Operator Guidebook to IMS and New Generation Networks and Services," www.morianagroup.com, First Edition, pp. 451-934 (Aug. 2005) (Part 2 of 2).
Gonzalo et al., "The 3G IP Multimedia Subsystem," Chapter 3: General Principles of the IMS Architecture (Aug. 20, 2004).
"IP Multimedia Subsystem Ims Over and Applications," 3G Americas, pp. 1-17 (Jul. 2004).
"3rd Generation Partnership Project; technical Specification Group Core Network; IP Multimedia (IM) Session Handling; IM Call Model; Stage 2 (Release 6)," 3GPP TS 23.218, V6.1.0, pp. 1-56 (Mar. 2004).
"All-IP Core Network Multimedia Domain," 3rd Generation Partnerships Project 2 (3GPP2), 3GPP2 X.S0013-000-0, Version 1.0, pp. i-ii and 1-14 (Dec. 2003).
"3rd Generation Partnership Project; Technical Specification Group Core Network; Cx and Dx Interfaces Based on the Diameter Protocol; Protocol Details (Release 5)," 3GPP TS 29.229, V5.6.0, pp. 1-23 (Dec. 2003).

(56) References Cited

OTHER PUBLICATIONS

"Digital Cellular Telecommunications System (Phase 2+); Universal Mobile Telecommunications System (UMTS); IP Multimedia Subsystem (IMS); Stage 2 (Release 5)," 3GPP TS 23.228, V5.7.0, pp. 1-130 (Dec. 2002).
Rosenberg et al., "SIP: Session Initiation Protocol," RFC 3261, pp. 1-252 (Jun. 2002).
Howard, "Sipping IETF51 3GPP Security and Authentication," http://www3.ietf.org/proceedings/01aug/slides/sipping-7/index.htm (Dowloaded from Internet on Dec. 16, 2005) (Sep. 13, 2001).
Calhoun et al., "Diameter Base Protocol,"draft-ietf-aaa-diameter-07, Section 6.3, p. 68 (Jul. 2001).
Narten et al., "Privacy Extensions for Stateless Address Autoconfiguration in IPv6," RFC 3041, pp. 1-16 (Jan. 2001).
Faltstrom, "E.164 Number and DNS," RFC 2916, pp. 1-10 (Sep. 2000).
Vaha-Sipila, "URLs for Telephone Calls," RFC 2806, pp. 1-20 (Apr. 2000).
Aboba et al., "The Network Access Identifier," RFC 2486, pp. 1-8 (Jan. 1999).
Calhoun et al., "Diameter Proxy Server Extensions," IETF Working Draft, draft-calhoun-diameter-proxy-01.txt (Aug. 1, 1998).
Berners-Lee et al., "Uniform Resource Identifiers (URI): Generic Syntax," RFC 2396, pp. 1-38 (Aug. 1998).
Tekelec, "Eagle® Feature Guide," P/N 910-1225-01 (Jan. 1998).
Jalava, "Service Routing in 3GPP IP Multimedia Subsystem," Nokia, pp. 1-16 (Publication Date Unknown).
Declaration of Mark Kanode for U.S. Appl. No. 13/409,893 (Nov. 1, 2013).
Advisory Action for U.S. Appl. No. 13/192,410 (Oct. 24, 2013).
Final Office Action for U.S. Appl. No. 13/366,928 (Oct. 23, 2013).
Applicant-Initiated Interview Summary for U.S. Appl. No. 13/192,410 (Oct. 18, 2013).
Final Office Action for U.S. Appl. No. 13/409,949 (Sep. 19, 2013).
Notice of Allowance and Fee(s) Due for U.S. Appl. No. 13/409,914 (Apr. 25, 2014).
Supplemental Notice of Allowability for U.S. Appl. No. 13/409,949 (Apr. 24, 2014).
Non-Final Office Action for U.S. Appl. No. 13/366,928 (Mar. 21, 2014).
Commonly-assigned, co-pending U.S. Appl. No. 14/190,071 for "Methods, Systems, and Computer Program Products for Clustering and Communicating Between Internet Protocol Multimedia Subsystem (IMS) Entities and for Supporting Database Access in an IMS Network Environment," (Unpublished, filed Feb. 25, 2014).
Non-Final Office Action for U.S. Appl. No. 13/192,410 (Feb. 20, 2014).
Advisory Action Before the Filing of an Appeal Brief for U.S. Appl. No. 13/366,928 (Feb. 10, 2014).
Extended European Search Report for European Application No. 10841605.8 (Feb. 3, 2014).
Notice of Allowance and Fee(s) Due for U.S. Appl. No. 13/409,949 (Jan. 14, 2014).
Final Office Action for U.S. Appl. No. 13/409,914 (Dec. 30, 2013).
Notification of Publication and Entry into Examination Procedure for Chinese Patent Application No. 201280013938.6 (Dec. 18, 2013).
Communication of European publication number and information on the application of Article 67(3) EPC for European Application No. 12751986.6 (Dec. 11, 2013).
Communication of European publication number and information on the application of Article 67(3) EPC for European Application No. 12751783.7 (Dec. 11, 2013).
Communication of European publication number and information on the application of Article 67(3) EPC for European Application No. 12751812.4 (Dec. 11, 2013).
Communication of European publication number and information on the application of Article 67(3) EPC for European Application No. 12741984.4 (Nov. 13, 2013).
"3rd Generation Partnership Project; Technical Specification Group Services and System Aspects; Policy and charging control architecture (Release 9)," 3GPP TS 23.203, V9.3.0 (Dec. 2009).
"Cisco Content Services Gateway—2nd Generation Release 3.5 Installation and Configuration Guide," Chapter 10: Configuring Gx Support, pp. 10-1-10-10, Chapter 11: Configuring Mobile PCC Support, pp. 11-1-11-8, URL: http://www.cisco.com/en/US/docs/wireless/csg2/3.5/installation/guide/csg3-51.pdf (Jun. 5, 2009).
Notice of Allowance and Fee(s) Due for U.S. Appl. No. 12/974,869 (Aug. 19, 2013).
Final Office Action for U.S. Appl. No. 13/192,410 (Aug. 5, 2013).
Non-Final Office Action for U.S. Appl. No. 13/409,914 (Jun. 7, 2013).
Notice of Allowance and Fee(s) Due for U.S. Appl. No. 13/412,352 (May 28, 2013).
Communication of European publication number and information on the application of Article 67(3) EPC for European Application No. 12781800.3 (Feb. 12, 2014).
Final Office Action for U.S. Appl. No. 13/192,410 (Sep. 25, 2014).
Notice of Allowance and Fee(s) Due for U.S. Appl. No. 13/366,928 (Sep. 3, 2014).
Extended European Search Report for European Application No. 12752952.7 (Aug. 27, 2014).
Notification of the First Office Action for Chinese Application No. 201080065174.6 (Aug. 13, 2014).
Extended European Search Report for European Application No. 12751783.7 (Jul. 22, 2014).
Extended European Search Report for European Application No. 12751812.4 (Jul. 16, 2014).

* cited by examiner

Exemplary Diameter Binding Data

| Diameter Session Id | User Name | IMSI | IMPI | IMPU | SIP URI | NAI | Mobile/ Dialable Number | User IP Address | CDF Identifier / Address |
|---|---|---|---|---|---|---|---|---|---|
| aaa://10.0.0.1:1;1 | user1 @sample .com | 3101 5099 9999 991 | sip:user1 @sample .com | sip:user1 @sample .com | sip:user1 @sample .com | user1 @sample .com | 919-460- 0001 | 10.0.0.1 | CDF_1 |
| aaa://10.0.0.2:1;1 | user2 @sample .com | 3101 5099 9999 992 | sip:user2 @sample .com | sip:user2 @sample .com | sip:user2 @sample .com | user2 @sample .com | 919-460- 0002 | 10.0.0.2 | CDF_2 |
| aaa://10.0.0.3:1;1 | user3 @sample .com | 3101 5099 9999 993 | sip:user3 @sample .com | sip:user3 @sample .com | sip:user3 @sample .com | user3 @sample .com | 919-460- 0003 | 10.0.0.3 | CDF_1 |

METHODS, SYSTEMS, AND COMPUTER READABLE MEDIA FOR SHARING DIAMETER BINDING DATA

PRIORITY CLAIM

This application claims the benefit of U.S. Provisional Patent Application Ser. No. 61/448,041, filed Mar. 1, 2011; the disclosure of which is incorporated herein by reference in its entirety.

TECHNICAL FIELD

The subject matter described herein relates to sharing Diameter binding data. More specifically, the subject matter relates to methods, systems, and computer readable media for sharing Diameter binding data.

BACKGROUND

The Diameter protocol is a next generation authentication, authorization, and accounting (AAA) protocol. The Diameter base protocol is defined in IETF RFC 3588, the disclosure of which is incorporated by reference herein in its entirety. Commonly used within the Internet multimedia subsystem (IMS) architecture, the Diameter protocol was derived from the remote authentication dial-in user service (RADIUS) protocol. Historically, the RADIUS protocol was employed by Internet service providers (ISPs) to provide a secure communication channel between an ISP's access server and a secure location where user credential information was stored, e.g., a lightweight directory access protocol (LDAP) server. While the RADIUS protocol provided a standardized AAA exchange protocol, the emergence of new technologies and applications necessitated the development of a protocol capable of meeting ever-changing demands. Diameter aims to extend the standardized approach of RADIUS while providing expanded functionality and remaining open to future development.

As the prevalence of the Diameter protocol increases within providers' telecommunication networks, many providers are turning to distributed architectures for processing and routing the accompanying increase in volume of Diameter message traffic. While a distributed architecture may offer a provider advantages such as load balancing and redundancy, it also presents various issues. One such issue is sharing Diameter binding data within such a distributed architecture.

Accordingly, a need exists for methods, systems, and computer readable media for sharing Diameter binding data.

SUMMARY

According to one aspect, the subject matter described herein includes a method for sharing Diameter binding data. The method includes receiving, by a first Diameter signaling router (DSR), a first Diameter message requiring processing. The method also includes selecting, by the first DSR, a processing element to perform the required processing from a plurality of processing elements. The method further includes routing, by the first DSR, the received first Diameter message to the selected processing element. The method further includes creating, by the first DSR, a binding record associating the selected processing element with information associated with the received first Diameter message. The method further includes communicating, by the first DSR, the binding record to a second DSR.

According to another aspect, the subject matter described herein includes a system for sharing Diameter binding data. The system includes a first DSR. The first DSR includes a Diameter routing engine module configured to receive a first Diameter message requiring processing, select a processing element to perform the required processing from a plurality of processing elements, and route the received first Diameter message to the selected processing element. The first DSR also includes a binding query client module configured to create a binding record associating the selected processing element with information associated with the received first Diameter message and communicate the binding record to a second DSR.

As used herein, the term "node" refers to a physical computing platform including one or more processors and memory.

As used herein, the term "module" refers to software in combination with hardware (such as a processor) and/or firmware for implementing features described herein.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 4 is an exemplary Diameter binding data table for sharing Diameter binding data in accordance with embodiments of the subject matter described herein.

DETAILED DESCRIPTION

Figure 1:
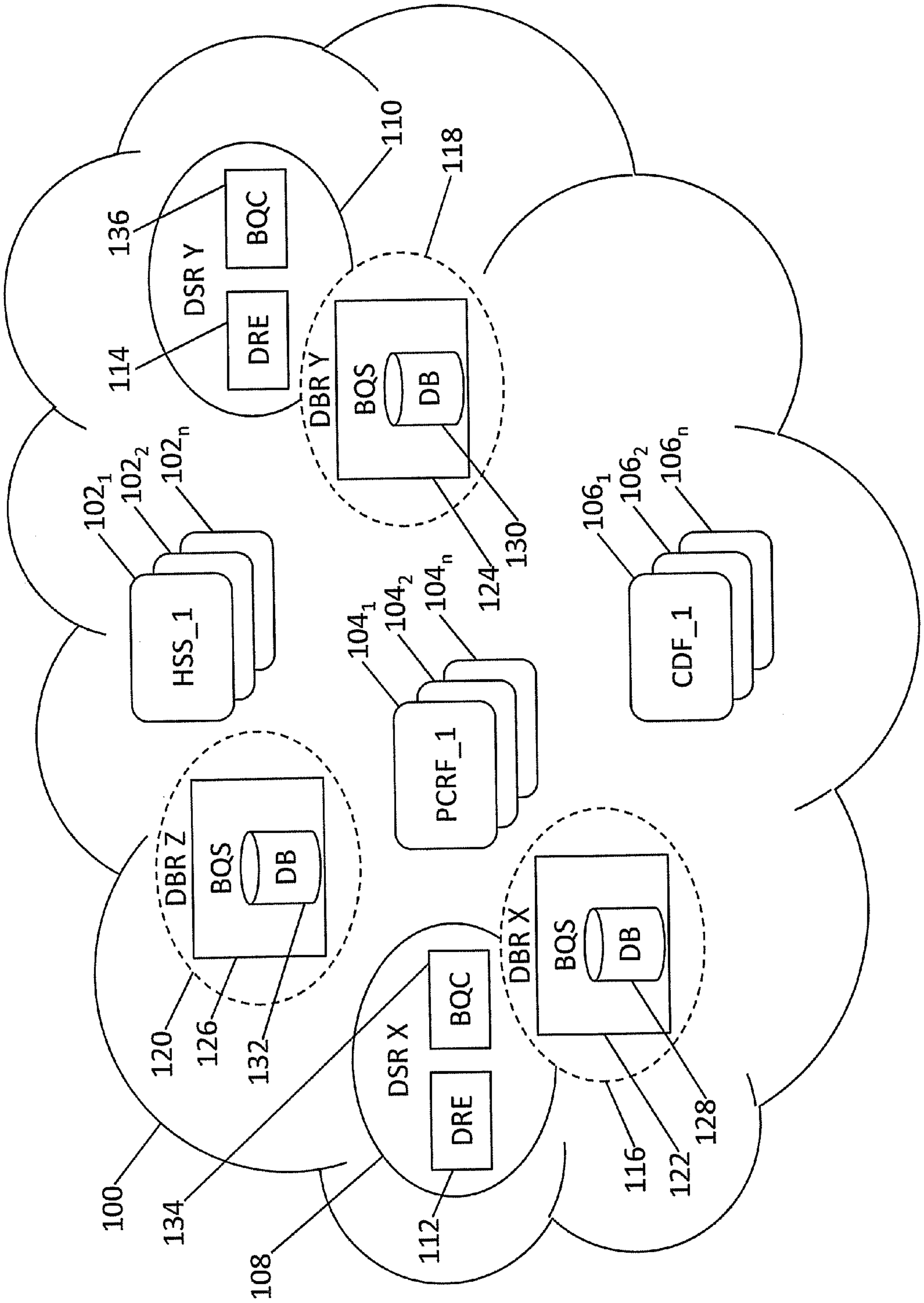
FIG. 1 is a network diagram illustrating an exemplary network environment for sharing Diameter binding data in accordance with embodiments of the subject matter described herein.

Methods, systems, and computer readable media for sharing Diameter binding data are provided. FIG. 1 is a network diagram illustrating an exemplary network environment for sharing Diameter binding data in accordance with embodiments of the subject matter described herein. Referring to FIG. 1, network environment 100 may include one or more processing elements. For example, network environment 100 may include home subscriber server (HSS) processing elements $\mathbf{102}_1$, $\mathbf{102}_2$, and $\mathbf{102}_n$. HSS processing elements $\mathbf{102}_1$, $\mathbf{102}_2$, and $\mathbf{102}_n$ may contain subscription related information such as subscriber profiles and may be utilized in the performance of authentication, authorization, and accounting functions. Network environment 100 may also include policy and charging rules function (PCRF) processing elements $\mathbf{104}_1$, $\mathbf{104}_2$, and $\mathbf{104}_n$. PCRF processing elements $\mathbf{104}_1$, $\mathbf{104}_2$, and $\mathbf{104}_n$ may serve as central policy decision points for network environment 100 and may make real-time policy decisions based on aggregated information pertaining to network environment 100. Network environment 100 may further include one or more charging entity processing elements, such as charging data function (CDF) processing elements, on-line charging function (OCF) processing elements, off-line charging function (OFCF) processing elements, and/or charging gateway function (CGF) processing elements. For example, network environment 100 may include CDF processing elements $\mathbf{106}_1$, $\mathbf{106}_2$, and $\mathbf{106}_n$.

Processing elements within network environment 100 (e.g., HSS processing elements $\mathbf{102}_1$, $\mathbf{102}_2$, and $\mathbf{102}_n$, PCRF processing elements $\mathbf{104}_1$, $\mathbf{104}_2$, and $\mathbf{104}_n$, and/or CDF processing elements $\mathbf{106}_1$, $\mathbf{106}_2$, and $\mathbf{106}_n$) may communicate with one another via Diameter messages, and network environment 100 may further include one or more Diameter signaling routers (DSRs) for routing such Diameter messages between network environment 100's processing elements. For example, network environment 100 may include DSR "X" 108 and DSR "Y" 110. DSR "X" 108 and DSR "Y" 110 may respectively include Diameter routing engine (DRE) modules 112 and 114, which may be configured to route Diameter messages between various Diameter nodes (e.g., HSS processing elements $\mathbf{102}_1$, $\mathbf{102}_2$, and $\mathbf{102}_n$, PCRF processing elements $\mathbf{104}_1$, $\mathbf{104}_2$, and $\mathbf{104}_n$, and/or CDF processing elements $\mathbf{106}_1$, $\mathbf{106}_2$, and $\mathbf{106}_n$) within network environment 100 via various Diameter interfaces (e.g., Gy, Ro, Rf, and S6a interfaces) and may enable DSR "X" 108 and/or DSR "Y" 110 to function as Diameter routing agents, Diameter proxy agents, and/or Diameter translation agents for Diameter messages within network environment 100.

DSR "X" 108 and DSR "Y" 110 may be part of a distributed Diameter routing platform for network environment 100 and may work in collaboration to route Diameter messages within network environment 100. For example, DSR "X" 108 and DSR "Y" 110 may utilize load sharing to distribute the Diameter message routing requirements of network environment 100 amongst each other. Working in collaboration to route Diameter messages within network environment 100, however, may require each of DSR "X" 108 and DSR "Y" 110 to be cognizant of the routing being performed by its counterpart. For example, it may be advantageous for DSR "Y" 110 to be aware that DSR "X" 108 has routed Diameter messages associated with a specific Diameter session or associated with a specific subscriber to a particular processing element within network environment 100 for performing processing required by such messages. Moreover, the identity of particular processing elements within network environment 100 may be obscured from other processing elements that need to communicate with them (e.g., the identities of one or more CDFs may be unknown to one or more charging trigger functions (CTFs)). In such scenarios, DSR "X" 108 may form a binding record associating such a specific Diameter session or subscriber with the particular processing element being utilized to perform the required processing within network environment 100.

In accordance with embodiments of the subject matter described herein, such Diameter binding data may be shared within network environment 100 (e.g., between DSR "X" 108 and DSR "Y" 110). For example, network environment 100 may include one or more Diameter binding repositories (DBRs) for facilitating the sharing of Diameter binding data between DSR "X" 108 and DSR "Y" 110. In some embodiments, DSR "X" 108 and DSR "Y" 110 may each be associated with their own respective DBR. For example, DSR "X" 108 may be associated with DBR "X" 116 and DSR "Y" 110 may be associated with DBR "Y" 118. In such embodiments, DBR "X" 116 may be co-located at a common network node with DSR "X" 108 and/or DBR "Y" 118 may be collocated at a common network node with DSR "Y" 110. In some embodiments, DSR "X" 108 and DSR "Y" 110 may both be associated with a centralized DBR, such as DBR "Z" 120. In such embodiments, DBR "Z" 120 may be co-located at a common network node with DSR "X" 108, co-located at a network node with DSR "Y" 110, or located at a network node distinct from DSR "X" 108 and DSR "Y" 110.

DBR "X" 116, DBR "Y" 118, and DBR "Z" 120 may respectively include binding query server (BQS) modules 122, 124, and 126 for respectively hosting binding databases 128, 130, and 132. Binding databases 128, 130, and 132 may include one or more binding records generated by DSR "X" 108 and/or DSR "Y" 110 associating information associated with received Diameter messages with one or more processing elements. For example, binding databases 128, 130, and 132 may include one or more binding records generated by DSR "X" 108 and/or DSR "Y" 110 associating Diameter session identification information, username information, international mobile subscriber identity (IMSI) information, Internet protocol (IP) multimedia subsystem (IMS) private identity (IMPI) information, IMS public identity (IMPU) information, session initiation protocol (SIP) uniform resource identifier (URI) information, network access identifier (NAI) information, mobile/dialable number information, IMS charging identifier (ICID) information, and/or user IP address information associated with Diameter messages received by DSR "X" 108 and/or DSR "Y" 110 with one or more processing elements of network environment 100 (e.g., HSS processing elements $\mathbf{102}_1$, $\mathbf{102}_2$, and $\mathbf{102}_n$, PCRF processing elements $\mathbf{104}_1$, $\mathbf{104}_2$, and $\mathbf{104}_n$, and/or CDF processing elements $\mathbf{106}_1$, $\mathbf{106}_2$, and $\mathbf{106}_n$).

DSR "X" 108 and DSR "Y" 110 may respectively include binding query client (BQC) modules 134 and 136 for generating and communicating binding queries to one or more of DBR "X" 116's BQS module 122, DBR "Y" 118's BQS module 124, and DBR "Z" 120's BQS module 126 for retrieving one or more binding records respectively stored within binding databases 128, 130, and 132. Table 1 illustrates an exemplary query for retrieving a binding record.

TABLE 1

| Exemplary Binding Record Query |
|---|
| Subscriber Identifier: <user1@sample.com> |
| Assigned Processing Element: <CDF_2> |
| Sequence Number: <00001> |
| Timestamp: < January 1, 1900 00:00 UTC> |

As Table 1 illustrates, a query for retrieving a binding record may include information for identifying a binding record such as a subscriber identifier associated with a received Diameter message that requires processing (e.g., processing by an OCF processing element). Such a query may also include an initial assignment (e.g., a default OCF processing element) for performing the required processing if a binding record matching the query is not located. Such a query may further include a sequence number for identifying lost requests and a timestamp for measuring latency.

Upon receiving a query for retrieving a binding record, DBR "X" 116's BQS module 122, DBR "Y" 118's BQS module 124, and/or DBR "Z" 120's BQS module 126 may identify a binding record associated with the query and, in response, generate and communicate a query response to the requesting DSR (e.g., to DSR "X" 108's BQC module 134 or DSR "Y" 110's BQC module 136). Table 2 illustrates an exemplary query response.

TABLE 2

| Exemplary Binding Record Query Response |
|---|
| Subscriber Identifier: <user1@sample.com><br>Assigned Processing Element: <CDF_1><br>Sequence Number: <00001><br>Timestamp: < January 1, 1900 00:00 UTC> |

As Table 2 illustrates, a query response may include the subscriber identifier associated with the received Diameter message requiring processing. The query response may also include information identifying a processing element for performing the required processing (e.g., information identifying a CDF processing element). The query may also include the sequence number of the request and the timestamp of the request.

Figure 2A:
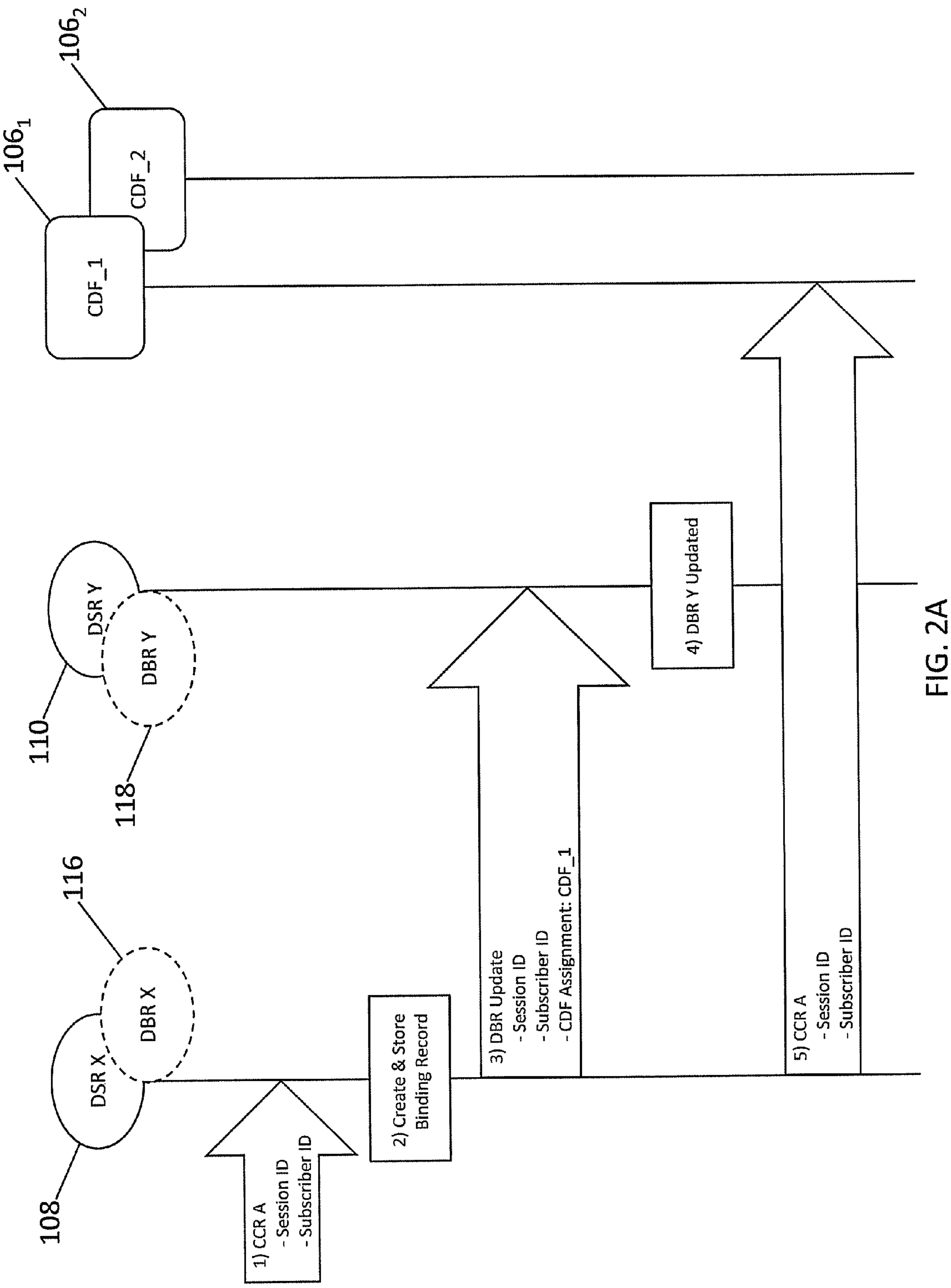
FIGS. 2A and 2B are respectively first and second portions of an exemplary message sequence for utilizing a distributed Diameter binding repository (DBR) to share Diameter binding data in accordance with embodiments of the subject matter described herein.
Figure 2B:
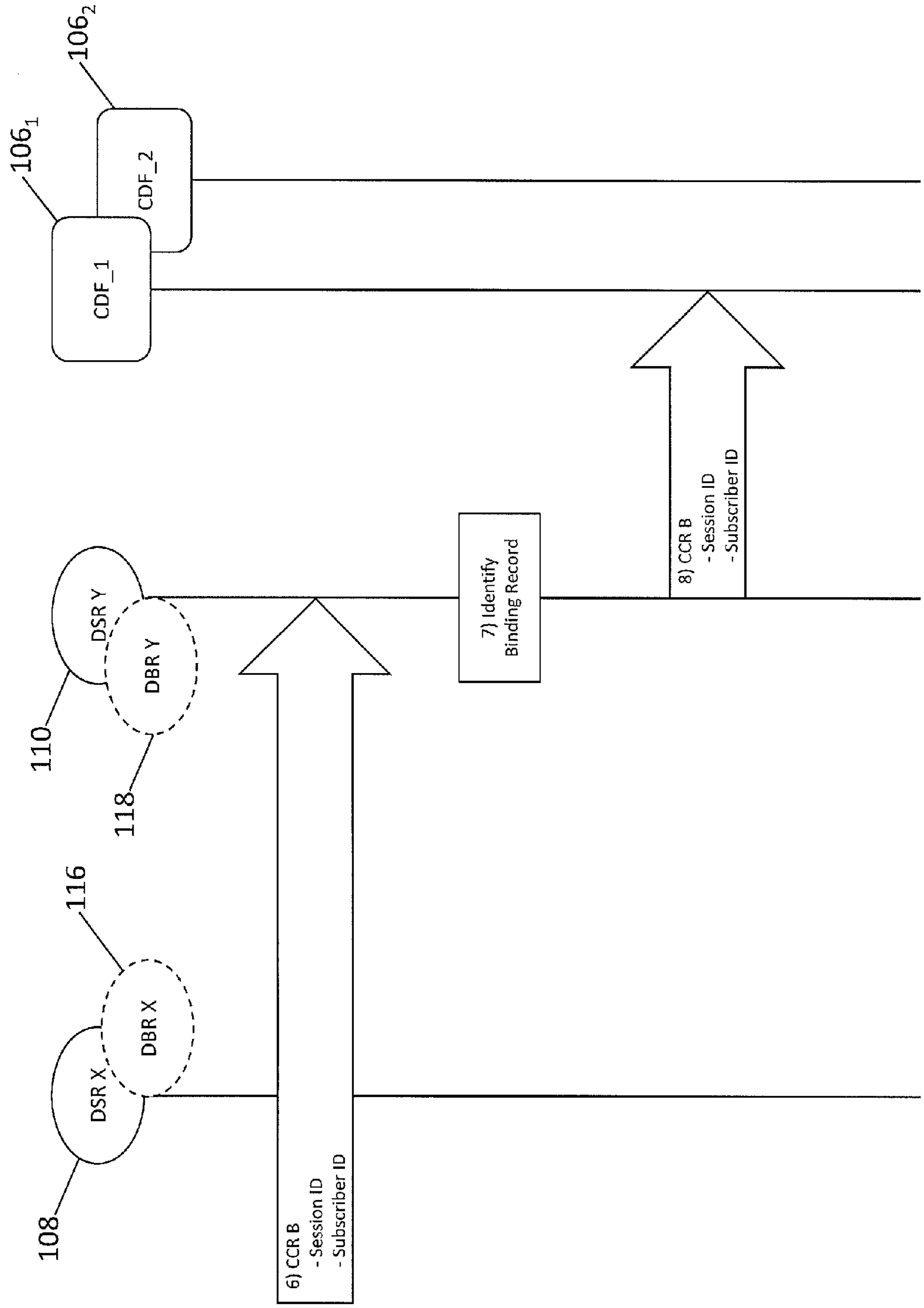

FIGS. 2A and 2B are respectively first and second portions of an exemplary message sequence for utilizing a distributed DBR to share Diameter binding data in accordance with embodiments of the subject matter described herein. Referring to FIG. 2A, at step 1, DSR "X" 108 may receive a Diameter message requiring processing. For example, DSR "X" 108 may receive a credit control request (CCR) message requiring processing. DSR "X" 108 may select a processing element to perform the processing required by the received CCR message. For example, DSR "X" 108 may select "CDF_1" $\mathbf{106_1}$ to perform the processing required by the received CCR message. In some embodiments, DSR "X" 108 may select a processing element to perform the processing required by the received Diameter message based on a load-balancing algorithm (e.g., a round-robin or weighted distribution scheme). Such an algorithm may be designed so a processing element with a relatively small load is selected for received Diameter messages requiring processing that are associated with a new Diameter session (i.e., a session which has not previously been associated with a particular processing element). In some embodiments, such an algorithm may select a processing element to perform the processing required by the received Diameter message based on load status information maintained by DSR 108 (e.g., Diameter transport connection congestion and/or abnormally high response delays) and/or load information received from one or more processing elements (e.g., "TOO_BUSY" responses).

At step 2, DSR "X" 108 may create a binding record associating the selected processing element (e.g., "CDF_1" $\mathbf{106_1}$) with information associated with the received CCR message (e.g., a session identifier associated with the received CCR message and/or a subscriber identifier associated with the received CCR message) and may store the binding record in DBR "X" 116's binding database 128. At step 3, DSR "X" 108 may communicate the binding record to DSR "Y" 110. In some embodiments, DSR "X" 108 may communicate the binding record by synchronizing DBR "X" 116's binding database 128 with DBR "Y" 118's binding database 130. For example, DSR "X" 108 may send a DBR update message to DSR "Y" 110 containing the binding record associating the selected processing element (e.g., "CDF_1" $\mathbf{106_1}$) with information associated with the received CCR message (e.g., a session identifier associated with the received CCR message and/or a subscriber identifier associated with the received CCR message) and, at step 4, DSR "Y" 110 may store the binding record in DBR "Y" 118's binding database 130, thereby updating DBR "Y" 118's binding database 130 to reflect the binding created by DSR "X" 108. At step 5, DSR "X" 108 may route the received Diameter message (e.g., the received CCR message) to the selected processing element (e.g., "CDF_1" $\mathbf{106_1}$).

Referring to FIG. 2B, at step 6, DSR "Y" 110 may receive a Diameter message requiring processing. For example, DSR "Y" 110 may receive a CCR message requiring processing. At step 7, DSR "Y" 110 may identify the binding record created by DSR "X" 108 and stored in DBR "Y" 118's binding database 130. For example, DSR "Y" 110 may identify the binding record created by DSR "X" 108 and stored in DBR "Y" 118's binding database 130 based on information associated with the received CCR message (e.g., a session identifier associated with the received CCR message and/or a subscriber identifier associated with the received CCR message). Having identified the binding record, DSR "Y" 110 may select a processing element specified by the binding record (e.g., "CDF_1" $\mathbf{106_1}$) to perform the required processing for the received CCR message. At step 8, DSR "Y" 110 may route the received Diameter message (e.g., the received CCR message) to the selected processing element (e.g., "CDF_1" $\mathbf{106_1}$).

Figure 3A:
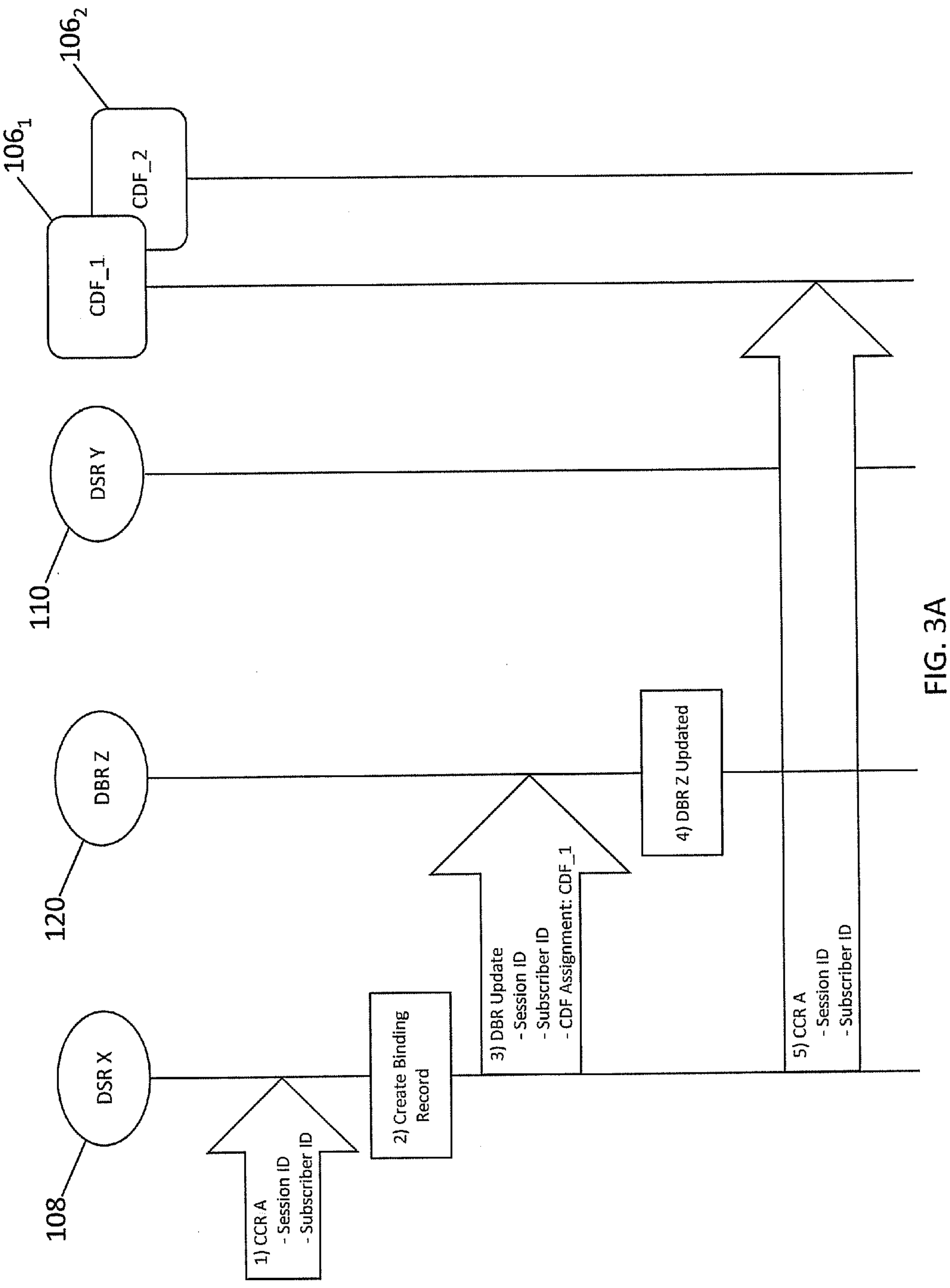
FIGS. 3A and 3B are respectively first and second portions of an exemplary message sequence for utilizing a centralized DBR to share Diameter binding data in accordance with embodiments of the subject matter described herein.
Figure 3B:
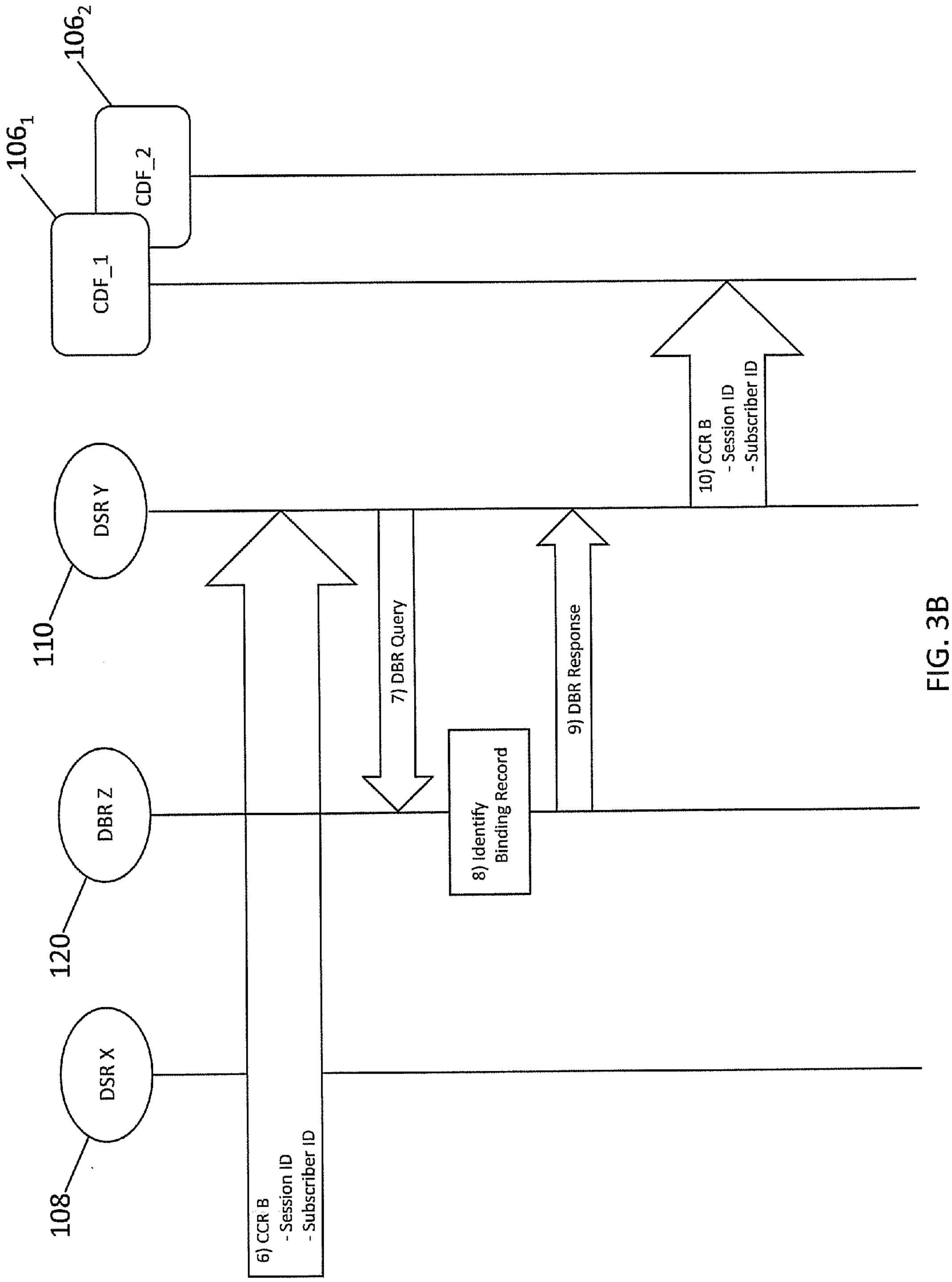

FIGS. 3A and 3B are respectively first and second portions of an exemplary message sequence for utilizing a centralized DBR to share Diameter binding data in accordance with embodiments of the subject matter described herein. Referring to FIG. 3A, at step 1, DSR "X" 108 may receive a Diameter message requiring processing. For example, DSR "X" 108 may receive a CCR message requiring processing. DSR "X" 108 may select a processing element to perform the processing required by the received CCR message. For example, DSR "X" 108 may select "CDF_1" $\mathbf{106_1}$ to perform the processing required by the received CCR message. At step 2, DSR "X" 108 may create a binding record associating the selected processing element (e.g., "CDF_1" $\mathbf{106_1}$) with information associated with the received CCR message (e.g., a session identifier associated with the received CCR message and/or a subscriber identifier associated with the received CCR message). At step 3, DSR "X" 108 may communicate the binding record to a centralized DBR, for example, DBR "Z" 120 which, at step 4, may store the binding record in DBR "Z" 120's binding database 132, thereby updating DBR "Z" 120's binding database 132 to reflect the binding created by DSR "X" 108. At step 5, DSR "X" 108 may route the received Diameter message (e.g., the received CCR message) to the selected processing element (e.g., "CDF_1" $\mathbf{106_1}$).

Referring to FIG. 3B, at step 6, DSR "Y" 110 may receive a Diameter message requiring processing. For example, DSR "Y" 110 may receive a CCR message requiring processing. At step 7, DSR "Y" 110 may query DBR "Z" 120 for a binding record associated with information associated with the received CCR message (e.g., a session identifier associated with the received CCR message and/or a subscriber identifier associated with the received CCR message). For example, DSR "Y" 110 may query DBR "Z" 120 for a binding record using a query such as the exemplary binding record query illustrated by Table 1. At step 8, DBR "Z" 120 may identify the binding record created by DSR "X" 108 and stored in DBR "Z" 120's binding database 132. For example, DBR "Z" 120 may identify the binding record created by DSR "X" 108 based on information associated with the received CCR message (e.g., a session identifier associated with the received CCR message and/or a subscriber identifier associated with the received CCR message). At step 9, DBR "Z" 120 may respond to DSY "Y" 110's query with a query response message identifying a processing element specified by the identified binding record (e.g., "CDF_1" $\mathbf{106}_1$) to perform the required processing for the received CCR message. For example, DBR "Z" 120 may respond to DSY "Y" 110's query with a query response message such as the exemplary binding record query response illustrated by Table 2. At step 10, DSR "Y" 110 may select the processing element specified by the query response message (e.g., "CDF_1" $\mathbf{106}_1$) and may route the received Diameter message (e.g., the received CCR message) to the selected processing element (e.g., "CDF_1" $\mathbf{106}_1$).

FIG. 4 is an exemplary Diameter binding data table for sharing Diameter binding data in accordance with embodiments of the subject matter described herein. Referring to FIG. 4, Table 400 may include columns for specifying one or more Diameter session identifiers, user names, IMSIs, IMPIs, IMPUs, SIP URIs, NAIs, mobile/dialable numbers, user IP addresses, and or processing element identifiers/addresses. Table 400 may include one or more entries for associating information associated with Diameter messages requiring processing with one or more processing elements for performing the required processing. For example, Table 400 may include an entry associating Diameter session "aaa://10.0.0.1:1;1", user name "user1@sample.com", IMSI "310150999999991", IMPI "sip:user1@sample.com", IMPU "sip:user1@sample.com", SIP URI "sip:user1@sample.com", NAI "user1@sample.com", mobile/dialable number "919-460-0001", user IP address "10.0.0.1", and processing element identifier "CDF_1". Table 400 may also include an entry associating Diameter session "aaa://10.0.0.2:1;1", user name "user2@sample.com", IMSI "310150999999992", IMPI "sip:user2@sample.com", IMPU "sip:user2@sample.com", SIP URI "sip:user2@sample.com", NAI "user2@sample.com", mobile/dialable number "919-460-0002", user IP address "10.0.0.2", and processing element identifier "CDF_2". Table 400 may further include an entry associating Diameter session "aaa://10.0.0.3:1;1", user name "user3@sample.com", IMSI "310150999999993", IMPI "sip:user3@sample.com", IMPU "sip:user3@sample.com", SIP URI "sip:user3@sample.com", NAI "user3@sample.com", mobile/dialable number "919-460-0003", user IP address "10.0.0.3", and processing element identifier "CDF_1". Table 400 may be stored in the binding database of one or more DBRs. For example, Table 400 may be stored in one or more of DBR "X" 116's binding database 128, DBR "Y" 118's binding database 130, and/or DBR "Z" 120's binding database 132.

Figure 5:
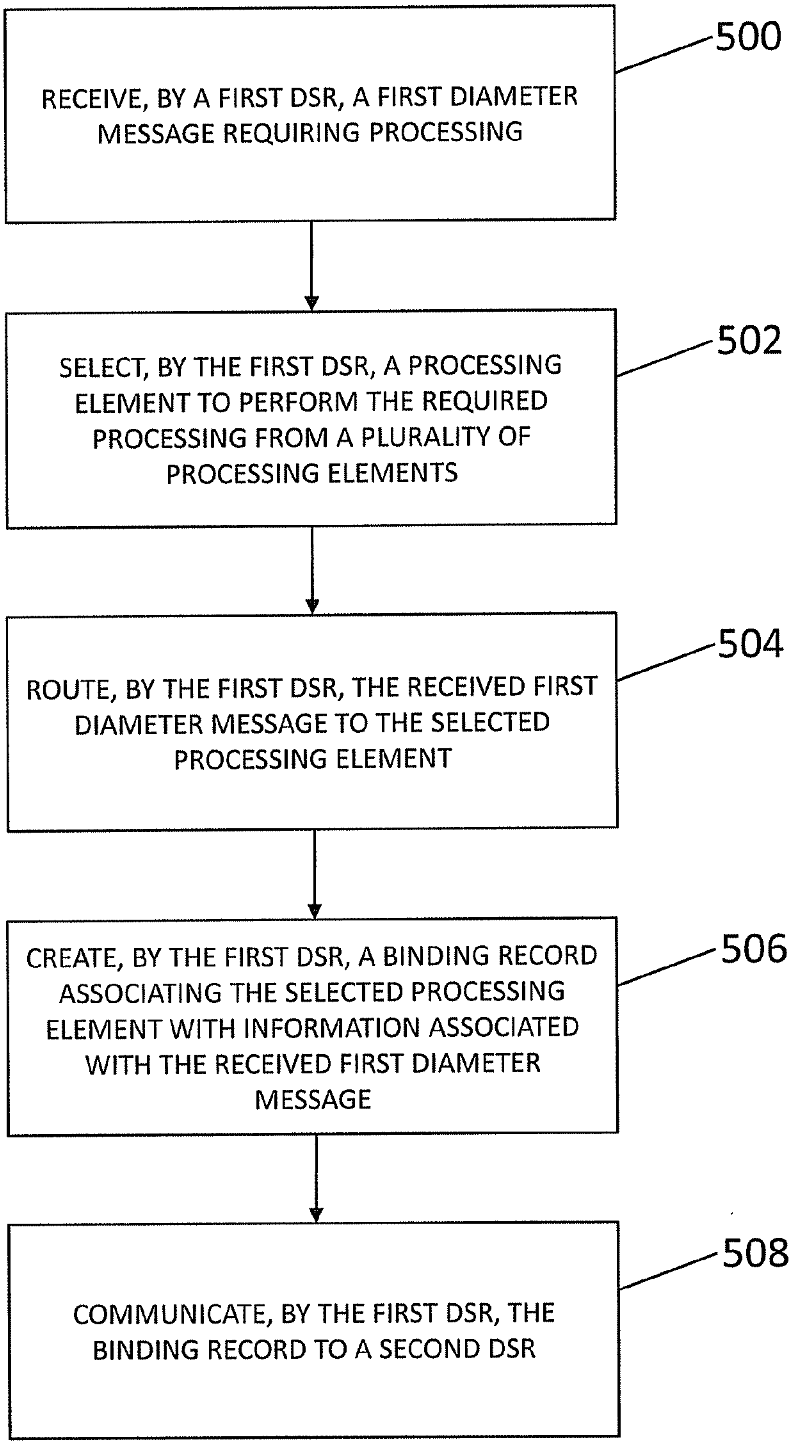
FIG. 5 is a flow chart illustrating an exemplary process for sharing Diameter binding data in accordance with embodiments of the subject matter described herein.

FIG. 5 is a flow chart illustrating an exemplary process for sharing Diameter binding data in accordance with embodiments of the subject matter described herein. Referring to FIG. 5, in step 500, a first Diameter message requiring processing is received by a first DSR. For example, DSR "X" 108 may receive a CCR message requiring processing. In step 502, a processing element is selected by the first DSR from a plurality of processing elements to perform the required processing. For example, "CDF_1" $\mathbf{106}_1$ may be selected from amongst CDF processing elements $\mathbf{106}_1$, $\mathbf{106}_2$, and $\mathbf{106}_n$ by DSR 108. In step 504, the received first Diameter message is routed by the first DSR to the selected processing element. For example, the received CCR message may be routed by DSR "X" 108 to "CDF_1" $\mathbf{106}_1$. In step 506, a binding record associating the selected processing element with information associated with the received first Diameter message is created by the first DSR. For example, a binding record associating "CDF_1" $\mathbf{106}_1$ with information associated with the received CCR message (e.g., a session identifier associated with the received CCR message and/or a subscriber identifier associated with the received CCR message). In step 508, the binding record is communicated by the first DSR to a second DSR. For example, DSR "X" 108 may send a DBR update message to DSR "Y" 110 and DBR "Y" 118 may be updated to include the binding record created by DSR "X" 108 associating "CDF_1" $\mathbf{106}_1$ with information associated with the received CCR message (e.g., a session identifier associated with the received CCR message and/or a subscriber identifier associated with the received CCR message).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for sharing Diameter binding data, the method comprising:

receiving, by a first Diameter signaling router (DSR), a first Diameter message requiring processing by a Diameter processing element;

selecting, by the first DSR, a Diameter processing element to perform the required processing from a plurality of processing elements;

routing, by the first DSR, the received first Diameter message to the selected Diameter processing element;

creating, by the first DSR, a binding record associating the selected Diameter processing element with information associated with the received first Diameter message, the information including a session identifier;

storing the binding record in a Diameter binding repository associated with the first DSR;

communicating, by the first DSR, the binding record to a second DSR by transmitting a message containing the binding record from the first DSR to the second DSR;

at the second DSR, synchronizing a Diameter binding repository associated with the second DSR with the Diameter binding repository associated with the first DSR, wherein synchronizing the Diameter binding repository associated with the second DSR includes updating, by the second DSR, the binding record in the Diameter binding repository associated with the second DSR;

at a third DSR, receiving a Diameter signaling message requiring processing by a Diameter processing element, transmitting, by the third DSR, a query message to the second DSR for the binding record; and at the second DSR, receiving the query message and responding to the query message with a response message identifying the Diameter processing element in the binding record.

2. The method of claim 1 further comprising:

receiving, by the second DSR, a second Diameter message requiring processing by a Diameter processing element;

selecting, by the second DSR based on the communicated binding record and information, including the session identifier, associated with the received second Diameter message, the Diameter processing element previously selected by the first DSR to perform the required processing; and routing, by the second DSR, the received second Diameter message to the selected processing element.

3. The method of claim 2 wherein selecting, by the second DSR, the processing element previously selected by the first DSR comprises selecting the processing element based on the binding record stored in the Diameter binding repository associated with the second DSR.

4. The method of claim 3 wherein selecting, by the second DSR, the processing element previously selected by the first DSR comprises identifying the binding record based on the information associated with the received second Diameter message.

5. The method of claim 2 wherein communicating, by the first DSR, the binding record to the second DSR comprises:

storing, by the first DSR, the binding record in a Diameter binding repository (DBR) associated with the first DSR and the second DSR; and retrieving, by the second DSR, the binding record from the DBR.

6. The method of claim 5 wherein selecting, by the second DSR, the processing element previously selected by the first DSR comprises selecting, by the second DSR, the processing element based on the binding record retrieved from the DBR.

7. The method of claim 5 wherein retrieving, by the second DSR, the binding record comprises identifying the binding record based on the information associated with the received second Diameter message.

8. The method of claim 5 wherein the DBR is co-located with the first DSR at a first network node, and the second DSR is located at a second network node distinct from the first network node.

9. The method of claim 5 wherein the DBR is co-located with the second DSR at a first network node, and the first DSR is located at a second network node distinct from the first network node.

10. The method of claim 5 wherein the DBR is located at a first network node, the first DSR is located at a second network node distinct from the first network node, and the second DSR is located at a third network node distinct from the first network node and the second network node.

11. The method of claim 2 wherein at least one of the information associated with the received first Diameter message and the information associated with the received second Diameter message comprises at least one of Diameter session identification information, username information, international mobile subscriber identity (IMSI) information, Internet protocol (IP) multimedia subsystem (IMS) private identity (IMPI) information, IMS public identity (IMPU) information, session initiation protocol (SIP) uniform resource identifier (URI) information, network access identifier (NAI) information, mobile/dialable number information, IMS charging identifier (ICID) information, and user IP address information.

12. The method of claim 1 wherein at least one of the first DSR and the second DSR comprises at least one of a Diameter routing agent, a Diameter proxy agent, a Diameter redirect agent, and a Diameter translation agent.

13. The method of claim 1 wherein the binding record creates an association between a Diameter session that the received first Diameter message is associated with and at least one of a charging entity associated with the selected processing element, a policy and charging rules function (PCRF) associated with the selected processing element, and a home subscriber server (HSS) associated with the selected processing element.

14. The method of claim 13 wherein the binding record creates the association between the Diameter session that the received first Diameter message is associated with and a charging entity associated with the selected processing element, and wherein the charging entity comprises at least one of a charging data function (CDF), an on-line charging function (OCF), an off-line charging function (OFCF), and a charging gateway function (CGF).

15. The method of claim 1 wherein the binding record creates an association between a subscriber identifier that the received first Diameter message is associated with and at least one of a charging entity associated with the selected processing element, a policy and charging rules function (PCRF) associated with the selected processing element, and a home subscriber server (HSS) associated with the selected processing element.

16. The method of claim 15 wherein the binding record creates the association between the subscriber identifier that the received first Diameter message is associated with and a charging entity associated with the selected processing element, and wherein the charging entity comprises at least one of a charging data function (CDF), an on-line charging function (OCF), an off-line charging function (OFCF), and a charging gateway function (CGF).

17. A system for sharing Diameter binding data, the system comprising:

first, second and third Diameter signaling routers (DSRs), the first DSR comprising:

at least one processor;

a Diameter routing engine module implemented by the at least one processor and configured to receive a first Diameter message requiring processing by a Diameter processing element, select a Diameter processing element to perform the required processing from a plurality of Diameter processing elements, and route the received first Diameter message to the selected Diameter processing element;

a binding query client module implemented by the at least one processor and configured to create a binding record associating the selected Diameter processing element with information, including a session identifier, associated with the received first Diameter message and communicate the binding record to a the second DSR by transmitting a message containing the binding record from the first DSR to the second DSR; and a Diameter binding repository associated with the first DSR for storing the binding record;

wherein the second DSR is configured to synchronize a Diameter binding repository associated with the second DSR with the Diameter binding repository associated with the first DSR, wherein synchronizing the Diameter binding repository associated with the second DSR includes updating, by the second DSR, the binding record in the Diameter binding repository associated with the second DSR;

wherein the third DSR is configured to receive a Diameter message requiring processing by a Diameter processing element, to transmit a query message to the second DSR for the binding record; and wherein the second DSR is configured to receive the query message and respond to the query message with a response message identifying the Diameter processing element in the binding record.

18. The system of claim 17 wherein the second DSR is configured to:

receive a second Diameter message requiring processing by a Diameter processing element;

select, based on the communicated binding record and information associated with the received second Diameter message, the Diameter processing element previously selected by the first DSR to perform the required processing; and route the received second Diameter message to the selected processing element.

19. The system of claim 18 wherein the second DSR is configured to select the processing element based on the binding record stored in the second DBR Diameter binding repository associated with the second DSR.

20. The system of claim 19 wherein the second DSR is configured to select the processing element by identifying the binding record stored in the second DBR Diameter binding repository associated with the second DSR based on the information associated with the received second Diameter message.

21. The system of claim 18 wherein the first DSR is configured to communicate the binding record to the second DSR by storing the binding record in a Diameter binding repository (DBR) associated with the first DSR and the second DSR, and wherein the second DSR is configured to retrieve the binding record from the DBR.

22. The system of claim 21 wherein the second DSR is configured to select the processing element previously selected by the first DSR based on the binding record retrieved from the DBR.

23. The system of claim 21 wherein the second DSR is configured to retrieve the binding record by identifying the binding record based on the information associated with the received second Diameter message.

24. The system of claim 21 wherein the DBR is co-located with the first DSR at a first network node, and the second DSR is located at a second network node distinct from the first network node.

25. The system of claim 21 wherein the DBR is co-located with the second DSR at a first network node, and the first DSR is located at a second network node distinct from the first network node.

26. The system of claim 21 wherein the DBR is located at a first network node, the first DSR is located at a second network node distinct from the first network node, and the second DSR is located at a third network node distinct from the first network node and the second network node.

27. The system of claim 18 wherein at least one of the information associated with the received first Diameter message and the information associated with the received second Diameter message comprises at least one of Diameter session identification information, username information, international mobile subscriber identity (IMSI) information, Internet protocol (IP) multimedia subsystem (IMS) private identity (IMPI) information, IMS public identity (IMPU) information, session initiation protocol (SIP) uniform resource identifier (URI) information, network access identifier (NAI) information, mobile/dialable number information, IMS charging identifier (ICID) information, and user IP address information.

28. The system of claim 17 wherein at least one of the first DSR and the second DSR comprises at least one of a Diameter routing agent, a Diameter proxy agent, a Diameter redirect agent, and a Diameter translation agent.

29. The system of claim 17 wherein the binding record creates an association between a Diameter session that the received first Diameter message is associated with and at least one of a charging entity associated with the selected processing element, a policy and charging rules function (PCRF) associated with the selected processing element, and a home subscriber server (HSS) associated with the selected processing element.

30. The system of claim 29 wherein the binding record creates the association between the Diameter session that the received first Diameter message is associated with and a charging entity associated with the selected processing element, and wherein the charging entity comprises at least one of a charging data function (CDF), an on-line charging function (OCF), an off-line charging function (OFCF), and a charging gateway function (CGF).

31. The system of claim 17 wherein the binding record creates an association between a subscriber identifier that the received first Diameter message is associated with and at least one of a charging entity associated with the selected processing element, a policy and charging rules function (PCRF) associated with the selected processing element, and a home subscriber server (HSS) associated with the selected processing element.

32. The system of claim 31 wherein the binding record creates the association between the subscriber identifier that the received first Diameter message is associated with and a charging entity associated with the selected processing element, and wherein the charging entity comprises at least one of a charging data function (CDF), an on-line charging function (OCF), an off-line charging function (OFCF), and a charging gateway function (CGF).

33. A non-transitory computer readable medium comprising computer executable instructions that when executed by a processor of a computer control the computer to perform steps comprising:

receiving, by a first Diameter signaling router (DSR), a first Diameter message requiring processing by a Diameter processing element;

selecting, by the first DSR, a Diameter processing element to perform the required processing from a plurality of processing elements;

routing, by the first DSR, the received first Diameter message to the selected Diameter processing element;

creating, by the first DSR, a binding record associating the selected Diameter processing element with information associated with the received first Diameter message, the information including a session identifier;

storing the binding record in a Diameter binding repository associated with the first DSR;

communicating, by the first DSR, the binding record to a second DSR by transmitting a message containing the binding record from the first DSR to the second DSR;

at the second DSR, synchronizing a Diameter binding repository associated with the second DSR with the Diameter binding repository associated with the first DSR, wherein synchronizing the Diameter binding repository associated with the second DSR includes updating, by the second DSR, the binding record in the Diameter binding repository associated with the second DSR; and at a third DSR, receiving a Diameter signaling message requiring processing by a Diameter processing element, transmitting, by the third DSR, a query message to the second DSR for the binding record; and at the second DSR, receiving the query message and responding to the query message with a response message identifying the Diameter processing element in the binding record.

* * * * *

UNITED STATES PATENT AND TRADEMARK OFFICE

CERTIFICATE OF CORRECTION

PATENT NO. : 8,918,469 B2
APPLICATION NO. : 13/409893
DATED : December 23, 2014
INVENTOR(S) : Sprague et al.

It is certified that error appears in the above-identified patent and that said Letters Patent is hereby corrected as shown below:

In the Claims

Column 11, line 14
replace “stored in the second DBR Diameter binding”
with --stored in the Diameter binding--

Column 11, line 18
replace “stored in the second DBR Diameter binding”
with --stored in the Diameter binding--

Signed and Sealed this
Seventeenth Day of November, 2015

Michelle K. Lee
*Director of the United States Patent and Trademark Office*